United States Patent
Ederfors (10) Patent No.: US 11,953,074 B2
(45) Date of Patent: Apr. 9, 2024

(54) SUSPENSION FOR OUTDOOR ROBOTIC TOOLS

(71) Applicant: HUSQVARNA AB, Huskvarna (SE)

(72) Inventor: Lars Ederfors, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 908 days.

(21) Appl. No.: 16/967,594

(22) PCT Filed: Feb. 7, 2019

(86) PCT No.: PCT/SE2019/050103
§ 371 (c)(1),
(2) Date: Aug. 5, 2020

(87) PCT Pub. No.: WO2019/160470
PCT Pub. Date: Aug. 22, 2019

(65) Prior Publication Data
US 2021/0270338 A1     Sep. 2, 2021

(30) Foreign Application Priority Data

Feb. 16, 2018   (SE) .................................... 1850166-8

(51) Int. Cl.
*F16F 6/00* (2006.01)
*A01D 34/00* (2006.01)
(Continued)

(52) U.S. Cl.
CPC ............ *F16F 6/005* (2013.01); *A01D 34/008* (2013.01); *A01D 34/828* (2013.01); *A01D 67/00* (2013.01);
(Continued)

(58) Field of Classification Search
CPC .. A47L 2201/00; A47L 2201/04; B60L 15/20; B60L 53/16; B62D 57/00;
(Continued)

(56) References Cited

U.S. PATENT DOCUMENTS 4,119,900 A * 10/1978 Kremnitz ............. G05D 1/0255
                                                    318/587
5,440,216 A *  8/1995 Kim ....................... G01S 15/931
                                                    15/340.1
(Continued)

FOREIGN PATENT DOCUMENTS

CN           201404156 Y       2/2010
EP           2803255 A1  * 11/2014   ........... A01D 34/008
(Continued)

OTHER PUBLICATIONS

Swedish Search Report for Application No. 1850166-8 dated Sep. 6, 2018.
(Continued)

Primary Examiner — Arpad Fabian-Kovacs
(74) Attorney, Agent, or Firm — Burr & Forman LLP (57) ABSTRACT

An outdoor robotic tool comprising a first part and a second part, wherein the first part supports the second part through a suspension arrangement. The suspension arrangement comprises a first component, which comprises at least one magnetic member; and a second component, which comprises at least one magnetic member. The first component is attached to the first part, wherein the second component is attached to the second part, wherein at least one of the magnetic members of suspension arrangement is a permanent magnet; and wherein a magnetic member of the first component is positioned so as to magnetically interact with a magnetic member of the second component when in use. A magnetic field sensing unit may be present that comprises a control unit and a magnetic field sensor. A method for detecting the alignment of the first part relative to the second part, wherein the method comprises detecting the magnetic field using the magnetic field sensing unit.

18 Claims, 4 Drawing Sheets

(51) Int. Cl.
| | |
|---|---|
| *A01D 34/82* | (2006.01) |
| *A01D 67/00* | (2006.01) |
| *F16P 3/00* | (2006.01) |
| *G05D 1/00* | (2006.01) |
| *A01D 101/00* | (2006.01) |
| *B60L 53/16* | (2019.01) |
| *B62D 57/00* | (2006.01) |

(52) U.S. Cl.
CPC ............ *F16P 3/008* (2013.01); *G05D 1/0225* (2013.01); *A01D 2101/00* (2013.01); *A47L 2201/00* (2013.01); *A47L 2201/04* (2013.01); *B60L 53/16* (2019.02); *B62D 57/00* (2013.01); *G05D 1/0022* (2013.01); *G05D 1/027* (2013.01)

(58) Field of Classification Search
CPC ........ F16F 6/005; F16F 3/008; G05D 1/0022; G05D 1/0225; G05D 1/027; A01D 34/00; A01D 34/008; A01D 34/828; A01D 67/00; A01D 2075/203; A01D 2101/00; Y02T 10/72
See application file for complete search history.

(56) References Cited

U.S. PATENT DOCUMENTS

| | | | |
|---|---|---|---|
| 9,968,864 B2* | 5/2018 | Clarke | G05D 1/0225 |
| 2007/0016328 A1* | 1/2007 | Ziegler | A47L 9/009 |
| | | | 701/23 |
| 2008/0109126 A1* | 5/2008 | Sandin | B60L 50/62 |
| | | | 56/229 |
| 2010/0032224 A1* | 2/2010 | Liu | B25J 5/007 |
| | | | 180/218 |
| 2011/0202175 A1 | 8/2011 | Romanov et al. | |
| 2012/0173047 A1* | 7/2012 | Bernstein | G05D 1/027 |
| | | | 701/28 |
| 2012/0311810 A1* | 12/2012 | Gilbert, Jr. | A47L 11/4044 |
| | | | 15/300.1 |
| 2014/0345957 A1* | 11/2014 | Bernstein | B62D 11/003 |
| | | | 180/21 |
| 2015/0224941 A1* | 8/2015 | Bernstein | B62D 61/00 |
| | | | 180/21 |
| 2016/0084436 A1 | 3/2016 | Gottinger et al. | |

FOREIGN PATENT DOCUMENTS

| | | |
|---|---|---|
| EP | 2803255 A1 | 11/2014 |
| WO | 2015161889 A1 | 10/2015 |

OTHER PUBLICATIONS

International Search Report and Written Opinion for International Application No. PCT/SE2019/050103 dated Mar. 21, 2019.

* cited by examiner

SUSPENSION FOR OUTDOOR ROBOTIC TOOLS

The present invention relates to an outdoor robotic tool comprising a first part and a second part, wherein the first part supports the second part through a suspension arrangement. The present invention also relates to a method for detecting the alignment of the first part to the second part of the outdoor robotic tool.

Outdoor robotic tools that move autonomously, such as robotic lawnmowers, may occasionally collide with objects.

The detection of a collision of an outdoor robotic tool is important in order to enable the tool to respond to that collision. A response may include re-directing the tool and/or logging the position of the collision.

In addition, outdoor robotic tools may be lifted or otherwise manipulated, for example by a user, whilst in use. Outdoor robotic tools may include movable parts, for example cutting blades, which are sufficiently safe during normal use of the outdoor robotic tool but which may be less safe when the outdoor robotic tool is manipulated or lifted.

Detection of manipulations of outdoor robotic tools is therefore also important in order to trigger a response that will render the tool safe during manipulation of the outdoor robotic tool. A response may include stopping the cutting blades.

One method of detecting collisions and lifts of outdoor robotic tools, such as robotic lawnmowers, is to detect the movement of the case of the tool relative to the chassis. This requires a suspension of the case to the chassis, which is usually achieved with columns and springs.

The inventors have realised that the use of columns and springs to suspend the case over the chassis suffers from requiring large volumes of unutilised space under the case. Furthermore, a complex geometry is often required to allow the case to move parallel to the chassis. In addition, some columns require complex manufacture and/or assembly steps.

According to a first aspect, the present invention provides an outdoor robotic tool comprising a first part and a second part, wherein the first part supports the second part through a suspension arrangement, the suspension arrangement comprising:
a) a first component, which comprises at least one magnetic member; and
b) a second component, which comprises at least one magnetic member;
wherein the first component is attached to the first part, wherein the second component is attached to the second part, wherein at least one of the magnetic members of suspension arrangement is a permanent magnet; and wherein a magnetic member of the first component is positioned so as to magnetically interact with a magnetic member of the second component when in use;
wherein the magnetic interaction between the magnetic member of the first component and the magnetic member of the second component tends to align the first part with the second part in a preferred alignment such that when a force causes the first part and second part to move out of the preferred alignment, the magnetic interaction between the magnetic member of the first component and the magnetic member of the second component tends to draw the first part and the second part back into the preferred alignment.

The present invention particularly relates to robotic lawnmowers. In one embodiment the first part of the tool is a chassis of the tool.

In one embodiment the second part of the tool is a case of the tool.

Accordingly, the invention also provides, in a second aspect, a case for a robotic lawnmower, wherein the case comprises a component, the component comprising at least one magnetic member; wherein the magnetic member is optionally a permanent magnet.

The tool of the first aspect of the invention is described in more detail below. However, the skilled reader will appreciate that the features of the tool of the first aspect, and especially the features of the second part of the first aspect, may be equally applicable to the case of the second aspect.

In one embodiment the second part of the tool defines the outer lateral periphery of the tool.

In contrast to the spring and column systems of the prior art, which require relatively large amounts of space between the chassis (i.e. the first part) and the case (i.e. the second part), the present invention allows the space between the chassis and the case to be minimised, increasing the efficiency of the overall space utilisation within the case. This may allow for a larger chassis to be used within a case of a given dimension, or a smaller case to be used with a chassis of a given dimension.

Furthermore, the present invention is far more simple to manufacture than column and spring-type suspension systems of the prior art.

The present invention relies on the magnetic interaction of at least one magnetic component of the first component with at least one magnetic component of the second component when in use. In one embodiment at least one magnetic component of the first component interacts with at least one magnetic component of the second component when in use so as to tend to attract one another.

In the absence of any external force, the magnetic interaction of the first component and the second component align the first part and the second part into a preferred alignment. The preferred alignment will preferably define both the position and the orientation of the first part and the second part, relative to one another.

In use, the action of an external force upon the second part, for example, may cause the first part and second part to move out of the preferred alignment. However, the magnetic interaction between the magnetic member of the first component and the magnetic member of the second component tends to draw the first part and the second part back into the preferred alignment.

In one embodiment the tool is configured to perform an action based on the state of the alignment of the first part and the second part and/or a change in the state of alignment of the first part and the second part. In one embodiment the tool includes a magnetic field sensing unit that comprises a control unit and a magnetic field sensor, wherein the magnetic field sensing unit is able to detect a magnetic field of at least one magnetic member of the suspension arrangement.

The magnetic field sensing unit will preferably be able to detect when the first part and the second part are aligned in the preferred alignment. Therefore, the magnetic field sensing unit will preferably also be able to detect when the first part and the second part are not aligned in the preferred alignment.

The magnetic field sensing unit will preferably be able to detect changes in the magnetic field. Such changes may result from the first part and the second part either moving out of alignment or moving into alignment.

The magnetic field sensing unit will detect manipulations of the outdoor robotic tool, such as collisions with an object and/or when an outdoor robotic tool is lifted by a user.

In one embodiment the tool is configured to perform an action based on the state of the alignment of the first part and the second part and/or a change in the state of alignment of the first part and the second part.

In one embodiment the magnetic field sensing unit comprises a Hall Effect sensor. Preferably, the magnetic field sensing unit comprises a three dimensional (3D) magnetic field sensor, such as a three dimensional Hall Effect sensor. 3D Hall Effect sensors are able to detect magnetic fields in three dimensions. Therefore, such a sensor will enable the robotic tool to detect many movements of the second part relative to the first part.

In one embodiment, the tool comprises two or more magnetic field sensing units, such as three or more magnetic field sensing units, or four or more magnetic field sensing units. In one embodiment, each suspension arrangement has a magnetic field sensing unit associated with it. In one embodiment, the outdoor tool comprises one magnetic field sensing unit and three or more, such as four or more, suspension arrangements.

In one embodiment, each magnetic field sensing unit may comprise two or more magnetic field sensors, such as three or more, or four or more magnetic field sensors. In one embodiment, each magnetic field sensing unit may comprise two or more control units, such as three or more, or four or more control units. In one embodiment, the control unit is connected to more than one magnetic field sensor.

It will be appreciated that a magnetic field sensor will need to be positioned within a sensing range of a permanent or temporary magnet of the magnetic field sensing unit. The sensing range will depend on the sensitivity of the magnetic field sensing unit and the strength of the magnetic field generated by the magnet. The magnetic field sensor may be positioned more closely to the first or the second component to alleviate any issues with magnetic noise generated by other components of the robotic tool.

In one embodiment, the magnetic field sensing unit comprises a sensor arrangement to hold the magnetic field sensor. In one embodiment, the magnetic field sensor may be positioned 5 cm or less, such as 2 cm or less, or 1 cm or less, from a first component and/or second component.

In order for the magnetic field sensing unit to be able to sense when the tool is manipulated, the first part must be able to move, relative to the second part, out of the preferred alignment.

The skilled person will be aware that outdoor robotic tools, such as robotic lawnmowers, move along the ground in a substantially horizontal plane when in use. A vertical axis is perpendicular to the horizontal plane. Preferably, the first component will be able to move relative to the second component in both the horizontal plane and the vertical axis.

In one embodiment the second part defines the outer lateral periphery of the tool. The outer lateral periphery of the tool may be defined as the perimeter of the tool in a horizontal plane.

As outdoor robotic tools tend to move parallel with the ground, in a generally horizontal plane, the collision of such a tool with an object on the ground causes a horizontal force to act upon the second part, i.e. the case. Such a horizontal force may cause a horizontal displacement of the second part of the robotic tool relative to, the first part i.e. the first part, such that the second part is moved out of the preferred alignment with the first part.

In addition, outdoor robotic tools may be subject to vertical forces, for example when a user lifts the outdoor robotic tool. In this case, a vertical force will cause a vertical displacement of the second part, of the robotic tool relative to the first part, such that the second part is moved out of the preferred alignment with the first part.

Movement of the second part relative to the first part in the vertical axis and/or the horizontal plane may be in one, two, three, four or five directions relative to the preferred alignment position, depending on the direction that suspension is required in. The skilled reader will appreciate that the above-described directions may consist of a maximum of four horizontal directions and one vertical direction. The vertical direction is orthogonal to each horizontal direction, and each horizontal direction is orthogonal to two other horizontal directions and inversely parallel to another horizontal direction. The second part may move relative to the first part in more than two directions at any one time.

If, for example, the second part is only to be suspended relative to the first part for front-impact collisions of the tool, the suspension arrangement must allow for movement of the second part horizontally backwards from the preferred alignment position, in relation to the first part. However, in a preferred example, if the second part is to be suspended relative to the first part for collisions in all horizontal and vertical directions, the suspension arrangement must allow for movement of the second part in all horizontal and vertical directions from the preferred alignment position, in relation to the first part.

In use, a first contact surface of the first part makes contact with a second contact surface of second part. In one embodiment, the first contact surface and the second contact surface are defined directly above the first component and the second component respectively. However, the first contact surface and the second contact surface may be defined at locations other than directly above the first component and the second component.

In one embodiment the first contact surface and the second contact surface are able to move over one another in the horizontal plane. In one embodiment, one or both of the first and second contact surfaces are flat and/or horizontal to allow for movement in the horizontal plane. Such substantially flat and/or horizontal contact surfaces will allow both for the departure of the first part and the second part from the preferred alignment as well as the return of the first part and the second part back into the preferred alignment.

It is also preferable that the first contact surface and the second contact surface are able to be separated in the vertical axis.

In one embodiment the first and/or second contact surface comprises a low-friction material. In one embodiment the low-friction material is a material that lowers the friction between the first contact surface and the second contact surface relative to the friction that would be produced if the contact surfaces were formed of the same material that forms a substantial part of the first part and/or the second part. Suitable low-friction materials include polytetrafluoroethylene (PTFE), PTFE/graphite, PTFE/molybdenum disulfide and molybdenum disulfide. Such materials will facilitate easy movement of the second part relative to the first part.

It may be that gravitational force acting upon the first part and/or the second part assists in the return to the preferred alignment. For example, the first contact surface may be generally convex, and the second contact surface may be generally concave; alternatively, the first contact surface may be generally concave, and the second contact surface may be generally convex.

The build-up of dirt between the contact surfaces may produce friction and/or adhesion between these surfaces. Therefore, it is preferable that the contact surfaces stay free from dirt when in use.

In one embodiment, one or both of the first and second contact surfaces are textured. For example, the first and/or second contact surface may be textured such that the greater the horizontal displacement between the contact surfaces, the more textured the first and/or second contact surfaces are.

Such texture will produce more friction between the first and the second surfaces the further that the first component is horizontally displaced from the second component. In one embodiment the texturing gradually increases, or increases in stepped amounts as the displacement between the first and the second components increases. This may prevent the first part and the second part from being too-far displaced from the preferred alignment.

The first part and/or the second part may optionally be configured so as to prevent extreme displacement of the second part relative to the first part in the horizontal plane and/or the vertical axis. For example, the first part and/or the second part may optionally be configured so as to prevent the displacement of the second part relative to the first part reaching a point where at least one magnetic member of the first component and at least one magnetic member of the second component do not significantly interact. For example, the prevention of extreme displacement may be executed using one or more stops and/or one or more rebutting protrusions. According to an example, the first and/or second parts may be configured to prevent the first and second parts from departing from the preferred alignment in any direction by more than 200 mm, or by more than 100 mm. According to an example, the first and/or second parts may be configured to allow the first and second parts to depart from the preferred alignment by more than 3 mm, or by more than 15 mm.

It will be preferable that three or more, such as four or more contact surfaces are positioned near the corners of a top surface, but on the top surface, of the first part to support similarly positioned contact surfaces on the second part. It will be appreciated that this arrangement will give the second part a degree of stability to the second part, relative to the first part.

The first and the second components each comprise at least one magnetic member, and at least one of the magnetic members of suspension arrangement must be a permanent magnet.

It will be appreciated that a permanent, or hard, magnet is a ferromagnetic material that is magnetised by an external magnetic field and that remains magnetised after the external magnetic field is removed. Temporary, or soft, magnets are other ferromagnetic materials that become magnetised in the presence of an external magnetic field but do not remain magnetised after the external magnetic field is removed. A permanent magnet will magnetically interact with either another permanent magnet or a temporary magnet. A temporary magnet will not magnetically interact with another temporary magnet in the absence of an existing magnetic field.

In one embodiment, the first component comprises at least one magnetic member that is a permanent magnet. In one embodiment, the second component comprises at least one magnetic member that is a permanent magnet. In one embodiment, both the first component and the second component comprise at least one magnetic member that is a permanent magnet.

A suitable permanent magnet may be an iron oxide magnet (for example a magnet made of $Fe_2O_3$), a neodymium magnet (for example a magnet made of a neodymium iron boron (NdFeB) alloy, such as $Nd_2Fe_{14}B$), a nickel magnet (for example a magnet made of an iron aluminium nickel cobalt alloy, such as Alnico) or a samarium magnet (for example a magnet made of a samarium-cobalt alloy, such as $SmCo_5$, or $Sm_2Co_{17}$).

A suitable temporary magnet may be an iron magnet, an iron-cobalt alloy magnet (for example a permendur magnet), a nickel magnet, a nickel-iron alloys magnet (for example a permalloy magnet), a silicon steel magnet, or a manganese zinc ferrite magnet.

The magnetic members of the first and second components may individually be any suitable size and shape. Cylindrical, cubic and cuboidal magnets are preferred for their availability. It is preferred that the magnets of the first and the second components are 1 cm thick or less, or 5 mm thick or less, or 2 mm thick or less. This may aid efficient utilisation of the space between the first part and the second part.

Because of the wide variety of magnets available—of different strengths, sizes and shapes—the suspension properties of the suspension arrangement will be able to be modified to make the suspension either firmer or looser by changing the magnets used.

In one embodiment, the first component and/or the second component additionally comprises a magnet retainer to secure each magnetic member to the first part or the second part of the tool. It may be that the magnet retainer defines the first contact surface and/or the second contact surface.

In one embodiment the first part has a top end and a bottom end, and the first component is positioned on or near the top end of the first part. In one embodiment the second part defines an under surface and an over surface, and the second component is positioned on or near the under surface of the second part. It will be appreciated that with such positioning, when second part covers the first part in use, the first component and the second component will be able to interact robustly and therefore to draw the second part and the first part into the preferred alignment.

In one embodiment the robotic tool comprises two or more, such as three or more, or four or more suspension arrangements, wherein each suspension arrangement comprises a first component and a second component.

In one embodiment, the magnetic components of the suspension arrangement are patterned and/or shaped so as to produce an uneven magnetic field. The uneven magnetic field produced by such shaping and/or patterning may be sensed by the magnetic field sensor to detect certain motions away from the preferred alignment.

For example, when using only one suspension apparatus comprising one first component and one second component and wherein the magnetic field is torus-shaped, as would be produced by cylindrical magnets, it will be difficult to detect a rotation of the second part relative to the first part about the magnets of the suspension apparatus. However, patterned or differently shaped magnets would produce a non-torus-shaped magnetic field to allow such rotations to be detected.

In a third aspect, the invention provides a method for aligning the first part of an outdoor robotic tool according to the first aspect relative to the second part of the tool, wherein the method comprises: positioning a magnetic member of the first component so as to magnetically interact with a magnetic member of the second component, in order that the magnetic interaction between the magnetic member of the first component and the magnetic member of the second component tends to align the first part with the second part in a preferred alignment such that when a force causes the first part and second part to move out of the preferred alignment, the magnetic interaction between the magnetic member of the first component and the magnetic member of the second component tends to draw the first part and the second part back into the preferred alignment.

In one embodiment wherein the tool comprises a magnetic field sensing unit that comprises a control unit and a magnetic field sensor, and wherein the magnetic field sensing unit is able to detect a magnetic field of at least one magnetic member of the suspension arrangement, the method is for detecting the alignment of the first part of an outdoor robotic tool according to the first aspect to the second part of the tool, wherein the method comprises detecting the magnetic field using the magnetic field sensing unit.

This method of sensing has the technical benefit of utilising a sensor with no moving parts.

In one embodiment the method further comprises the step of the control unit performing an action.

In one embodiment the method detects the state of alignment of the first part and the second part, and the action is based on the state of alignment. The state of alignment may indicate, for example, that the robotic tool has collided by an object, by detecting that the first and second parts have come out of alignment along a horizontal direction, and/or that the robotic tool has been lifted, by detecting that the first and second parts have come out of alignment in a vertical direction. In one embodiment the action is to prevent or cease operation of a cutting unit of the outdoor robotic tool. In one embodiment the action is to prevent or cease movement of the outdoor robotic tool. Such actions may be particularly preferable if, for example, the robotic tool has been lifted, and/or the second part has been removed from the first part.

In one embodiment the method detects a change in the state of alignment of the first part and the second part, and the action is based on the change in the state of the alignment. In one embodiment the method further comprises the step of the control unit performing an action based on the change in the state of alignment of the first part and the second part.

In one embodiment the action is to:
a) cease operation of a cutting unit of the outdoor robotic tool;
b) cease the motion of the outdoor robotic tool;
c) log the location of the collision and/or manipulation; or
d) control the outdoor robotic tool to change its movement direction, to steer away from an obstacle.

The detection of a change in the state of alignment of the first part and the second part may be indicative of a manipulation of the tool, such as a collision of the tool with an object. The particular action performed by the control unit may depend on the manipulation detected.

In one embodiment, the action is to stop the operation of a cutting unit of the outdoor robotic tool. This action is particularly preferable if the robotic tool is lifted.

In another embodiment, the action is to stop the motion of the outdoor robotic tool, or to log the location of the collision and/or manipulation. This action is particularly preferable if the robotic tool collides with an object on the side facing the direction of motion of the tool.

However, it may be that the detection of a collision or manipulation may result in no change in the action of the robotic tool. For example, if a collision is detected on the side facing away from the direction of motion of the tool, this might suggest that a collision with an object in motion, such as a toy, has been detected. As such, the tool may continue as previously intended.

In a fourth aspect, the invention provides a method of aligning a case of a robotic lawnmower with a chassis of said robotic lawnmower, the method comprising drawing the case to a preferred alignment with the chassis by means of magnetic interaction. The method may optionally comprise operating the robotic lawnmower to collide with an object such that the case is brought out of the preferred alignment with the chassis by the collision, and returning the case to the preferred alignment with the chassis by means of said magnetic interaction.

An embodiment of the present invention will now be described with reference to the accompanying drawings, in which.

Figure 1:
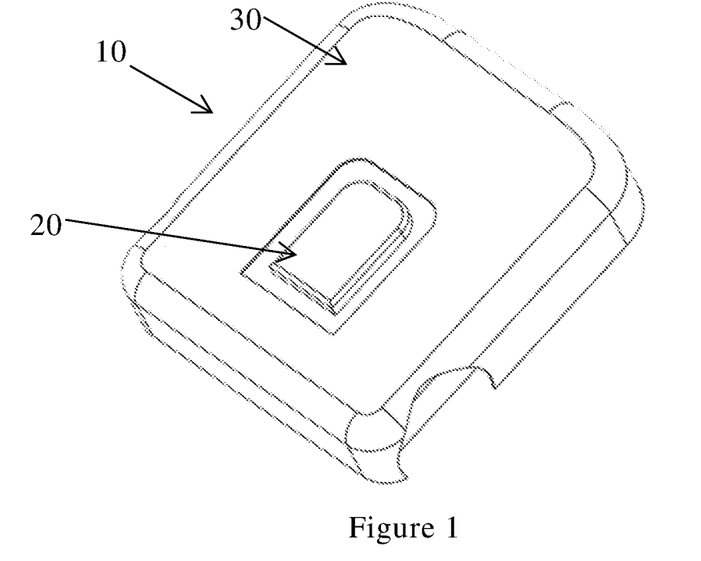
FIG. 1 is a perspective view of an outdoor robotic tool in accordance with the present invention, specifically a robotic lawnmower, from the top comprising a first part and a second part.

Referring firstly to FIG. 1 of the accompanying drawings, there is shown an outdoor robotic tool, specifically a self-propelled, autonomous robotic lawnmower 10, including a first part 20 and a second part 30. The first part 20 may be referred to as a chassis and the second part 30 may be referred to as a case. In this Figure the second part 30 covers the first part 20, as these components would be arranged when the robotic lawnmower 10 is in use. The first part 20 will typically contain cutting blades, wheels for propelling the robotic lawnmower, control circuitry with e.g. navigation electronics, and a power unit for the robotic lawnmower. The second part 30 defines the outer lateral periphery of the tool 10 and will typically protect the robotic lawnmower from damage caused by, for example, collisions and/or the weather.

Figure 2:
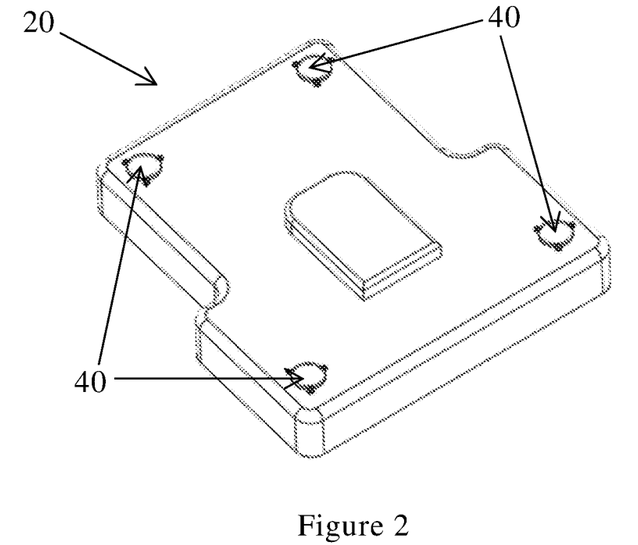
FIG. 2 is a perspective view of the first part depicted in FIG. 1 from the top, where the first part has four first components.

The first part 20 is shown in more detail in FIG. 2 of the accompanying drawings. The first part 20 has four first components 40. The first components 40 each comprise a magnetic member that comprises a magnet. The magnet is covered by and hidden behind a magnet retainer. In this embodiment, the magnet is a $Nd_2Fe_{14}B$ magnet. The magnet retainers individually define first contact surfaces for contact with the second part. In this embodiment the first contact surfaces are low in friction. Each magnet retainer is affixed to the first part by three attachments points, which could be screws. The first components 40 are positioned in the corners of the top surface of the first part 20, which allows the second part to be stably supported upon the first part.

Figure 3:
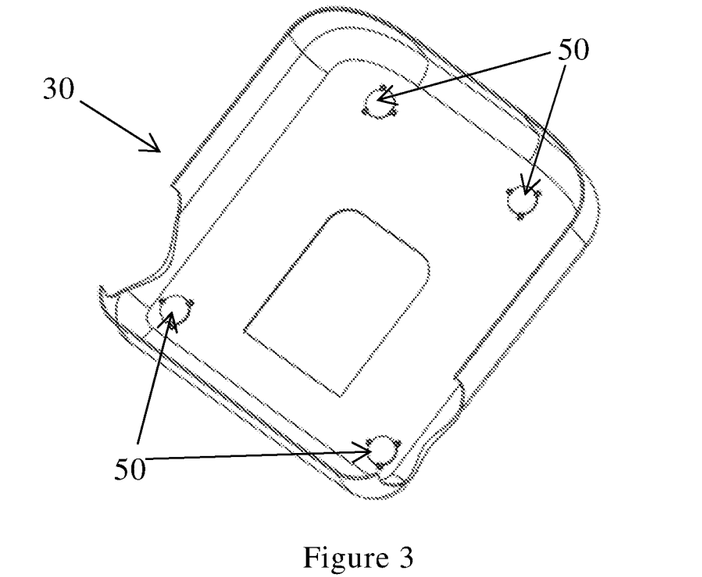
FIG. 3 is a perspective view of the second part depicted in FIG. 1 from the underside, where the second part has four second components.

The underside of the second part 30 is shown in FIG. 3 of the accompanying drawings. The second part 30 has four second components 50. The second components 50 each comprise a magnetic member that comprises a magnet. The magnet is covered by and hidden behind a magnet retainer. In this embodiment, the magnet is a $Nd_2Fe_{14}B$ magnet. The magnet retainers of the second components 50 individually define second contact surfaces for contact with the first part. In this embodiment the second contact surfaces are low in friction. Each magnet retainer is affixed to the second part 30 by three attachments points, which could be screws. The second components 50 are positioned in the corners of the inner surface of the second part 30, which allows the second part to be stably supported upon the first part.

Figure 4:
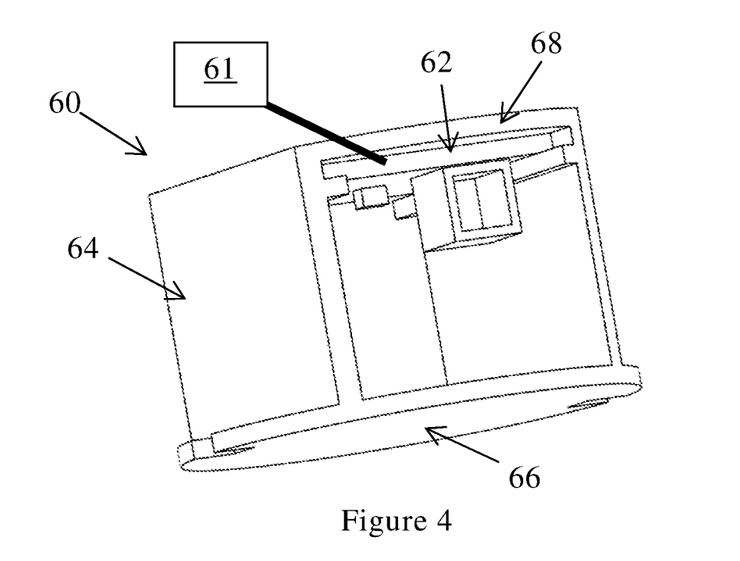
FIG. 4 is a perspective view of a magnetic field sensing unit comprising a magnetic field sensor.

In one embodiment, the present invention comprises a magnetic field sensing unit. FIG. 4 of the accompanying drawings shows an exemplary magnetic field sensing unit 60. The magnetic field sensing unit 60 comprises a control unit 61, a sensor board 62 and a sensor board holder 64. The sensor board holder 64 has a first end 66 and a second end 68. The first end 66 is for attachment to the first part 20, for example by a screw, whilst the second end 68 holds the sensor board 62. In this embodiment, the sensor board 62 comprises a 3D Hall Effect sensor.

Figure 5:
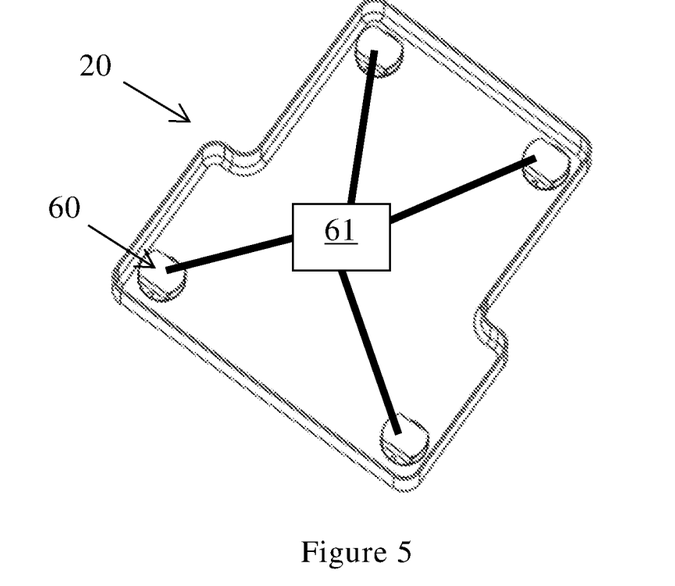
FIG. 5 is a perspective view of the first part depicted in FIG. 2 from the underside, where the first part has four magnetic field sensing units as depicted in FIG. 4.

FIG. 5 of the accompanying drawings shows the underside of the first part 20, to which a magnetic field sensing unit 60 has been provided. The magnetic field sensing unit 60 has four magnetic field sensors, each positioned in a corner of the under surface of the first part 20. In particular, each magnetic field sensor is positioned underneath each first component 40 shown in FIG. 2. One control unit 61 is used with the four magnetic field sensors.

Figure 6:
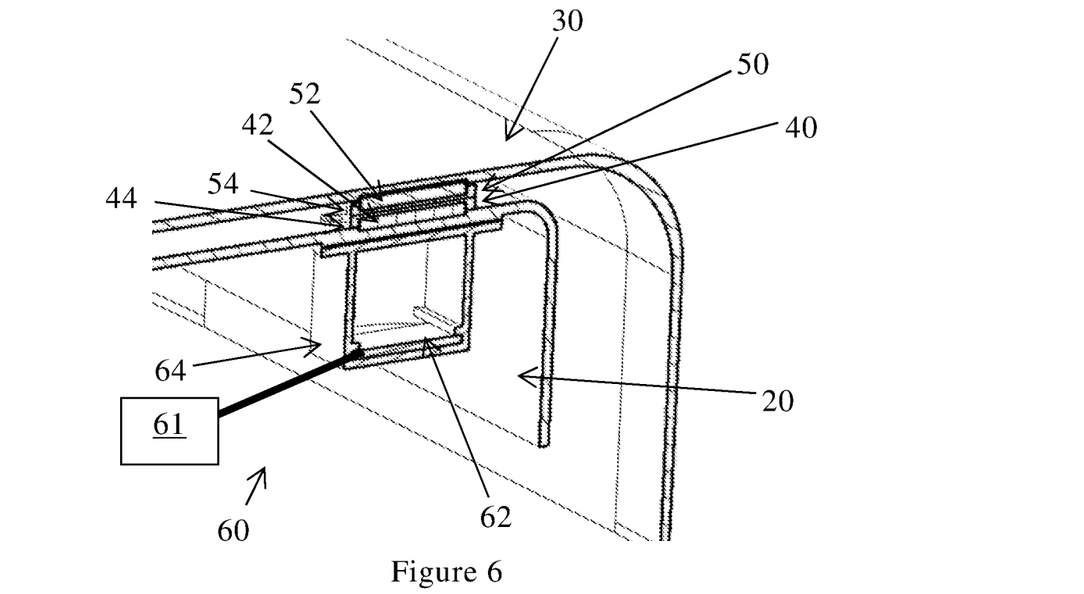
FIG. 6 is a perspective view of a cross-section through the outdoor robotic tool depicted in FIG. 1, showing the second part, the suspension arrangement, the first part and the magnetic field sensing unit, wherein the second part is in a preferred arrangement relative to the first part.

FIG. 6 of the accompanying drawings shows a cross-sectional view through a magnetic field sensing unit 60 and a suspension arrangement, the suspension arrangement comprising second part 30, second component 50, first component 40 and first part 20. In FIG. 6, the suspension arrangement is aligned as it would be in the preferred alignment. The first component 40 comprises a magnet 42 and a magnet retainer 44. The second component 50 comprises a magnet 52 and a magnet retainer 54. The magnet retainer 44 of the first component 40 defines a first contact surface, and the magnet retainer 54 of the second component 50 defines a second contact surface. The first contact surface and the second contact surface are each substantially flat, and in use will be substantially horizontal. The first contact surface makes contact with the second contact surface to hold the second part 30 above the first part 20. The sensor board holder 64 of the magnetic field sensing unit 60 holds the sensor board 62 at a set distance from the magnet 42 of the first component 40.

As can be seen, in the preferred alignment, the magnets 42, 52 are situated above one another, such that their interaction is at a maximum. The Hall Effect sensor on the sensor board 62 will typically be calibrated to the magnetic field at the preferred alignment.

Figure 7:
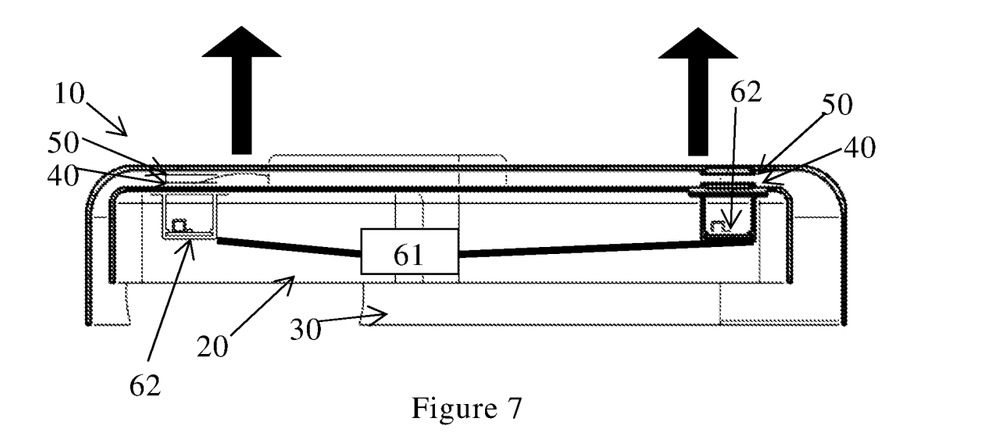
FIG. 7 is a cross-section of the outdoor robotic tool depicted in FIG. 1, where the second part has been lifted from the first part, as illustrated by the arrow.
Figure 8:
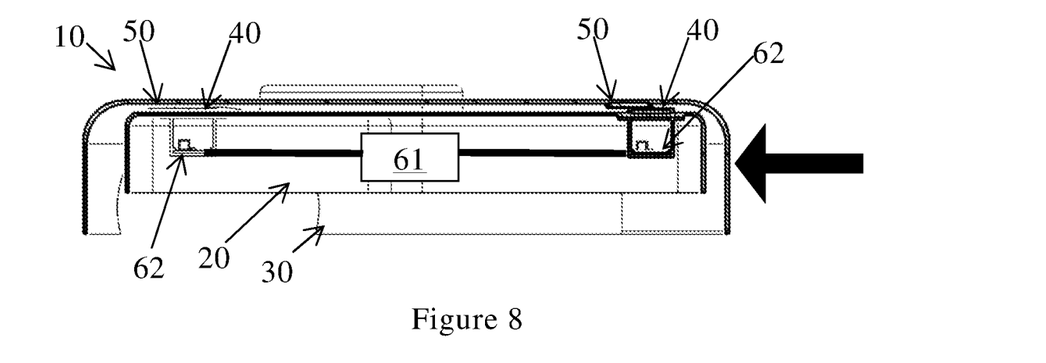
FIG. 8 is a cross-section of the outdoor robotic tool depicted in FIG. 1, wherein the second part has collided with an object from the right side, as illustrated by the arrow.

FIGS. 7 and 8 of the accompanying drawings depict the lifting and manipulation of the second part 30 relative to the first part 20 respectively. In each of these figures, the suspension arrangement and the magnetic field sensing unit on the right side (as viewed) are shown in cross-section, whereas the suspension arrangement and the magnetic field sensing unit on the left side (as viewed) are shown in side-on view.

Turning firstly to FIG. 7, the second part 30 is lifted from the first part 20 of the robotic lawnmower 10. It can be seen that the lifting force has exceeded the magnetic interaction of the first components 40 and the second components 50. Therefore, a vertical displacement has been generated between the contact surfaces of the first part 20 and the contact surfaces of the second part 30. The lifting force has caused the first part 20 and the second part 30 to move out of the preferred alignment. The vertical displacement of the first component 40 from the second component 50 has changed the magnetic field at the 3D Hall Effect sensor of the sensor board 62. The magnetic field sensing unit may detect a change in the direction and/or intensity of the magnetic field due to this vertical displacement. The control unit 61 of the magnetic field sensing unit will interpret the data from the Hall Effect sensor and act accordingly, such as to stop the cutting unit of the robotic lawnmower.

Turning now to FIG. 8, the second part 30 has been manipulated relative to the first part 20 of the robotic lawnmower 10. Such a manipulation may occur when the robotic lawnmower 10 is moving autonomously and collides with an object. The force resulting from the collision is shown as an arrow. It can be seen that the force has caused the second part 30 to move leftwards (as viewed) in relation to the first part Therefore, the contact surfaces of the second part 30 have been displaced leftwards in relation to the contact surfaces of the first part 20. The manipulation force has caused the first part 20 and the second part 30 to move out of the preferred alignment. The horizontal displacement of the first component 40 from the second component 50 has changed the magnetic field at the 3D Hall Effect sensor of the sensor board 62. The magnetic field sensing unit may detect a change in the direction and/or intensity of the magnetic field due to this horizontal displacement. The control unit 61 of the magnetic field sensing unit will interpret the data from the Hall Effect sensor and act accordingly, such as to stop the motion of the robotic lawnmower and/or to log the location of the manipulation.

The invention claimed is:

1. An outdoor robotic tool comprising a first part and a second part, wherein the first part supports the second part through a suspension arrangement, the suspension arrangement comprising:
   a) a first component comprising a first magnetic member; and
   b) a second component comprising a second magnetic member;
   wherein the first component is attached to the first part, wherein the second component is attached to the second part, wherein at least one of the first and second magnetic members of suspension arrangement is a permanent magnet; and wherein the first magnetic member of the first component is positioned to magnetically interact with the second magnetic member of the second component when in use;
   wherein the magnetic interaction between the first magnetic member of the first component and the second magnetic member of the second component aligns the first part with the second part in a preferred alignment such that when a force causes the first part and second part to move out of the preferred alignment, the magnetic interaction between the first magnetic member of the first component and the second magnetic member of the second component draws the first part and the second part back into the preferred alignment, wherein the first part defines at least one first contact surface, and wherein the second part defines at least one second contact surface, wherein the at least one first contact surface is in contact with the at least one second contact surface in use, and wherein the at least one first and/or at least one second contact surface comprises a low-friction material.

2. The tool according to claim 1, wherein the tool is a robotic lawnmower.

3. The tool according to claim 1, wherein the second part defines the outer lateral periphery of the tool.

4. The tool according to claim 1, wherein the tool further comprises a magnetic field sensing unit that comprises a control unit and a magnetic field sensor, wherein the magnetic field sensing unit is able to detect a magnetic field of the first magnetic member or the second magnetic member of the suspension arrangement.

5. The tool according to claim 4, wherein the magnetic field sensor is a three dimensional magnetic field sensor.

6. The tool according to claim 1, wherein one or more of the first magnetic member of the first component and the second magnetic member of the second component are designed to interact to attract one another in use.

7. The tool according to claim 1, wherein the permanent magnet is made of a neodymium iron boron (NdFeB) alloy.

8. The tool according to claim 1, wherein one or both of the first and second contact surfaces are textured, and wherein the greater the horizontal displacement from the preferred alignment, the higher the friction between the first and the second contact surfaces is due to a texture pattern of the first and/or second contact surfaces.

9. The tool according to claim 1, wherein the first component and/or the second component additionally comprises a magnet retainer to secure the magnetic member to the first part or the second part of the tool, respectively.

10. The tool according to claim 1, wherein the first and second magnetic members of the suspension arrangement are patterned and/or shaped to produce a non-torus-shaped magnetic field.

11. The tool according to claims 1, wherein the tool performs an action based on a state of the alignment of the first part and the second part and/or a change in the state of alignment of the first part and the second part.

12. The tool according to claim 2, wherein the first part is a chassis of the robotic lawnmower and wherein the second part is a case of the robotic lawnmower.

13. A case for a robotic lawnmower, wherein the case comprises a component, the component comprising at least one magnetic member; wherein the at least one magnetic member is a permanent magnet, and wherein the at least one magnetic member magnetically interacts with a magnetic member of a robotic lawnmower chassis to draw the case into a preferred alignment with the robotic lawnmower chassis, wherein the robotic lawnmower is operated to collide with an object such that the case is brought out of the preferred alignment with the chassis by the collision, and wherein the case is returned to the preferred alignment with the chassis by means of said magnetic interaction.

14. A method for aligning a first part of an outdoor robotic tool relative to a second part of the tool, wherein the method comprises:

positioning a first magnetic member of a first component to magnetically interact with a second magnetic member of a second component, in order that the magnetic interaction between the first magnetic member of the first component and the second magnetic member of the second component aligns the first part with the second part in a preferred alignment such that when a force causes the first part and second part to move out of the preferred alignment, the magnetic interaction between the magnetic member of the first component and the magnetic member of the second component draws the first part and the second part back into the preferred alignment;

operating the robotic lawnmower to collide with an object such that the case is brought out of the preferred alignment with the chassis by the collision, and returning the case to the preferred alignment with the chassis by means of said magnetic interaction.

15. The method of claim 14, further comprising detecting a state of alignment of the first part of the tool relative to the second part of the tool, wherein the method comprises detecting the magnetic field using a magnetic field sensing unit.

16. The method according to claim 15, further comprising conducting an action via a control unit, wherein the state of alignment of the first part and the second part is detected, and the action is based on a state of alignment.

17. The method according to claim 16, wherein the action is to:

a) prevent or cease operation of a cutting unit of the outdoor robotic tool; and/or b) prevent or cease movement of the outdoor robotic tool.

18. The method according to claim 15, wherein a change in the state of alignment of the first part and the second part is detected, and the action is based on the change in the state of the alignment, and wherein the action is to:

a) cease operation of a cutting unit of the outdoor robotic tool;

b) cease the motion of the outdoor robotic tool;

c) log the location of the collision and/or manipulation; or d) control the outdoor robotic tool to change its movement direction, to steer away from an obstacle.

* * * * *